United States Patent [19]

Kamoshita

[11] Patent Number: 4,686,665
[45] Date of Patent: Aug. 11, 1987

[54] MODE SWITCHING DEVICE IN A DISC PLAYBACK DEVICE

[75] Inventor: Yasuhiko Kamoshita, Hamamatsu, Japan

[73] Assignee: Nippon Gakki Seizo Kabushiki Kaisha, Hamamatsu, Japan

[21] Appl. No.: 773,304

[22] Filed: Sep. 6, 1985

[30] Foreign Application Priority Data

Sep. 14, 1984 [JP] Japan ............................ 59-139851[U]

[51] Int. Cl.$^4$ .......................... G11B 1/00; G11B 17/04
[52] U.S. Cl. .................................... 369/77.2; 369/215; 369/219; 369/221; 369/233; 369/243
[58] Field of Search .................... 369/77.1, 77.2, 75.2, 369/243, 233, 215, 219, 221

[56] References Cited

U.S. PATENT DOCUMENTS 4,507,768  3/1985  Ikedo et al. ...................... 369/77.1

*Primary Examiner*—Steven L. Stephan
*Attorney, Agent, or Firm*—Spensley, Horn, Jubas & Lubitz

[57] ABSTRACT

A mode switching device in a disc playback device comprises a loading device for transferring a disc or a case housing a disc between an eject position in which the disc or the disc case is inserted and ejected and a playback position in which the disc is played, a feed device for feeding a pickup head reading data recorded on the disc set in a playback position and a mode switching device for switching the mode between loading, eject and playback modes. The feed device can move across an overstroke region extending radially outwardly of a read-out position of the pickup head and the mode switching device performs switching of the mode when the feed device has reached a predetermined position in the overstroke region.

5 Claims, 30 Drawing Figures

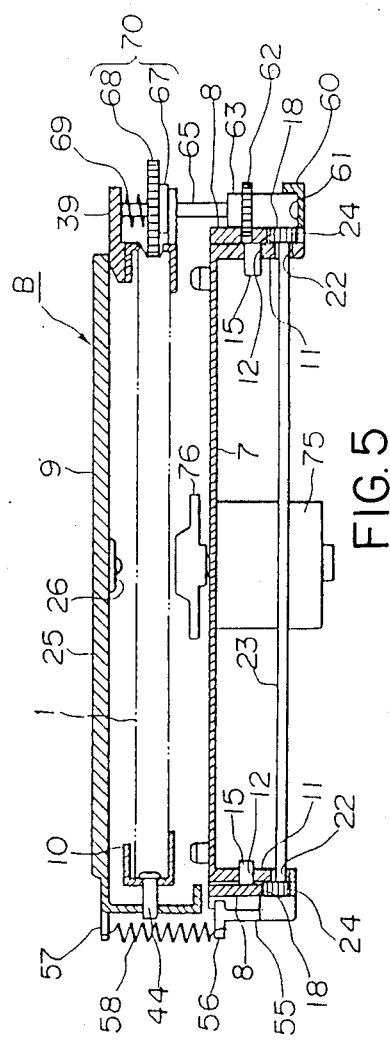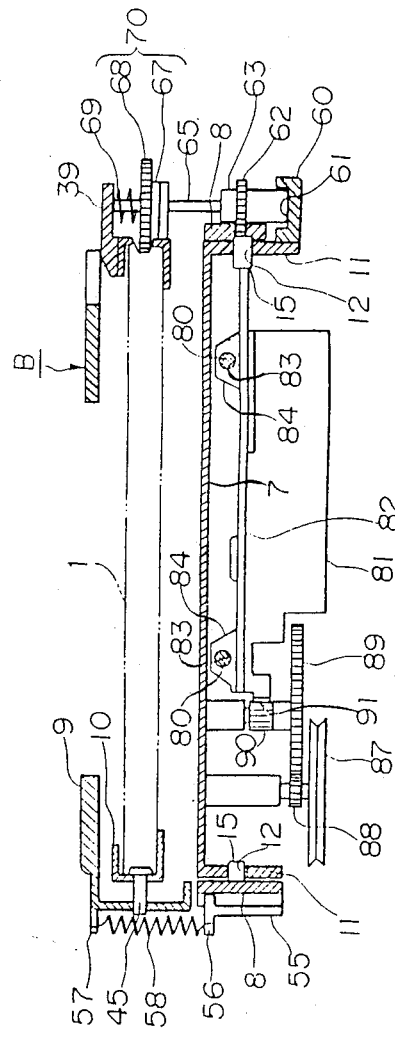

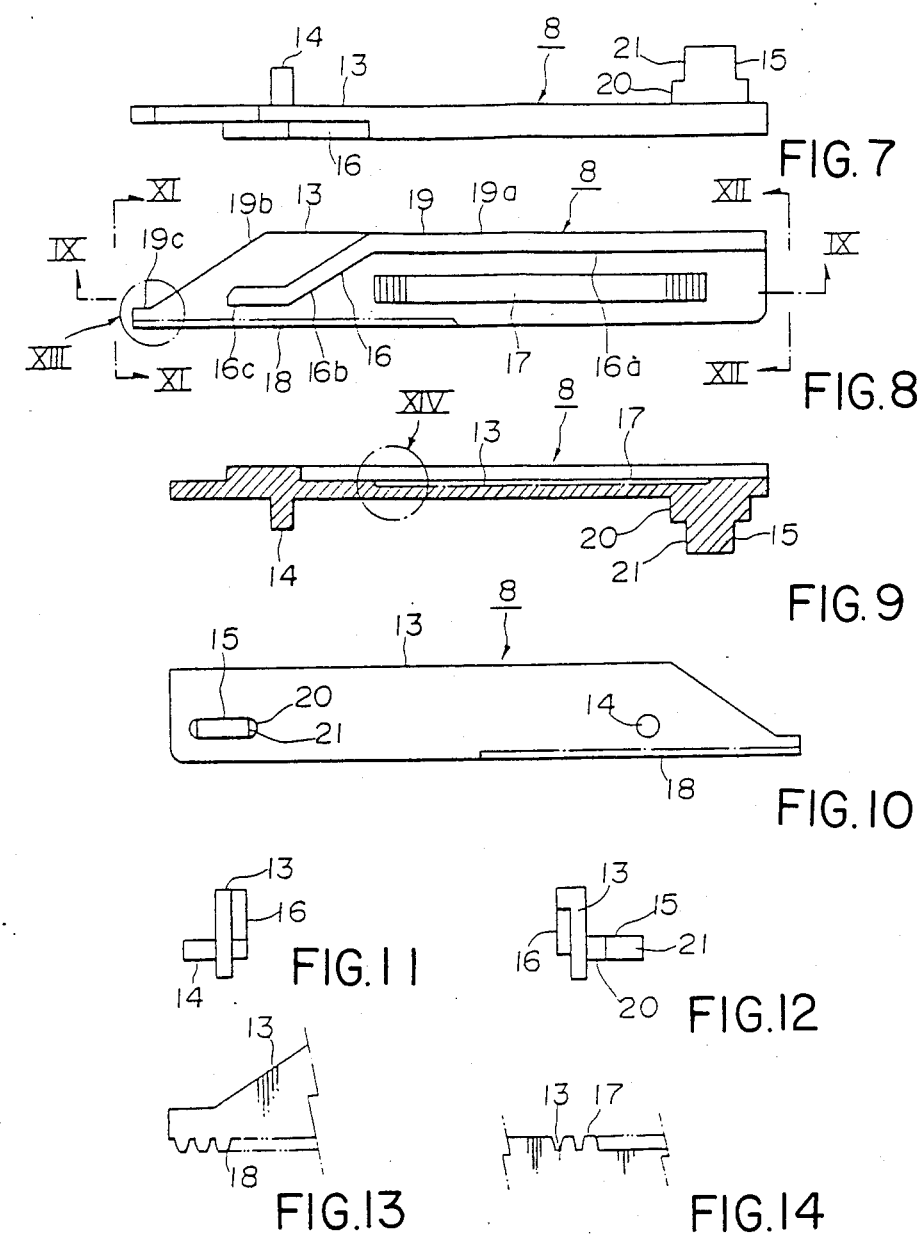

MODE SWITCHING DEVICE IN A DISC PLAYBACK DEVICE

BACKGROUND OF THE INVENTION

This invention relates to a mode switching device in a disc playback device used for playing a disc such as a Compact Disc for the Compact Disc Digital Audio System and an optical type video disc.

Construction of a disc playback device will first be described taking a Compact Disc player for example. A Compact Disc player generally automatically transfers a disc inserted in the device to a predetermined playback position in which the disc can be played, feeds an optical pickup head in a radial direction of the disc placed in the playback position and automatically transfers the disc after being played from the playback position to an eject position. For performing these operations, such disc playback device comprises a loading device which performs a loading operation for transferring the disc inserted in the device to the predetermined playback position and an ejecting operation for transferring the disc from the playback position to the eject position, a feed device which performs feeding of the pickup head in the radial direction of the disc and a mode switching device which performs switching of mode between various modes such as loading, playback and eject modes.

As the mode switching device for the disc playback device, it has been proposed to detect movements of some parts of the feed device, loading device and disc driving device by means of suitable detection devices such as microswitches and utilize detection signals provided by such detection devices as mode switching signals. This prior art device, however, necessitates a complicated construction due to limitations in the range of movement of these parts of the respective devices.

It is, therefore, an object of the present invention to provide a mode switching device in a disc playback device of a simplified construction utilizing the existing construction available in the disc playback device.

SUMMARY OF THE INVENTION

For achieving the above described object of the invention, the mode switching device according to the invention is characterized in that the feed device incorporated in the disc playback device is so constructed that the optical pickup head can move across an overstroke region extending radially outwardly of a disc read-out position relative to a disc set in a playback position and the mode is switched between loading, playback and eject modes when the pickup head has reached a predetermined position in this overstroke region.

According to the invention, the mode switching operation by the device can be performed by utilizing the movement of the feed device of the disc playback device with resulting simplification of the mode switching device.

According to one aspect of the invention, the switching of the mode is effected in such a manner that switching from the loading mode to the playback mode is made in association with a first movement of the pickup head across the overstroke region, switching from the playback mode to the eject mode is made in association with a second movement of the pickup head across the overstroke region and the same operations are repeated thereafter so that a mode switching operation reasonably adapted to the sequential operations of disc loading, disc playback, disc readout and disc ejecting in this type of disc playback device can be readily and smoothly realized.

According to another aspect of the invetion, mode switching signals to be supplied to a feed loading motor are provided by a push switch which is constructed in the form of a push-push type switch and, accordingly, signals for switching the mode between the respective modes can be produced as electrical signals without using plural switches.

BRIEF DESCRIPTION OF THE DRAWINGS

In the accompanying drawings,

FIG. 5 is a sectional view taken along lines V—V in FIG. 2;

FIG. 6 is a sectional view taken along lines VI—VI in FIG. 2;

FIG. 7 is a plan view of a carrier;

FIG. 8 is a front view of the carrier;

FIG. 9 is a sectional view taken along lines IX—IX in FIG. 8;

FIG. 10 is a rear view of the carrier;

FIG. 11 is a side elevation taken along lines XI—XI in FIG. 8;

FIG. 12 is a side elevation taken along lines XII—XII in FIG. 8;

FIG. 13 is an enlarged view of the portion indicated by arrow XIII in FIG. 8;

FIG. 14 is an enlarged view of the portion indicated by arrow XIV in FIG. 9;

DESCRIPTION OF PREFERRED EMBODIMENT

FIGS. 1 through 21 show an embodiment of the mode switching device in the disc playback device according to the present invention applied to a Compact Disc player.

A disc playback device (Compact Disc player) to be described below comprises a disc magazine case A for housing a disc such as a Compact Disc and a main body B of the device. The disc magazine case A in which a disc is exchangeably received is loaded in the main body B and the disc is played in a state in which it is received in the case A.

Figure 1:
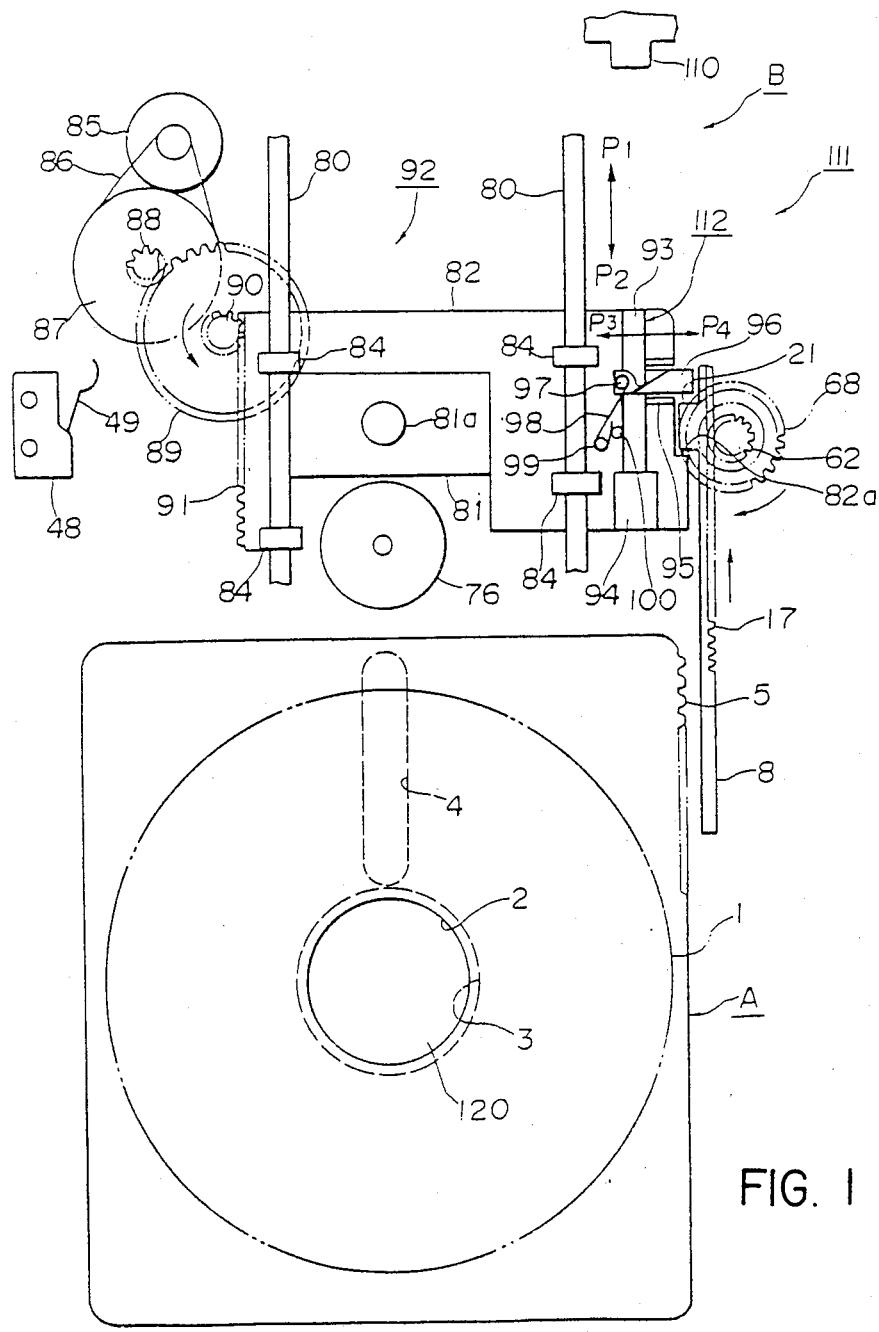
FIG. 1 is a plan view of essential portions of an embodiment of the mode switching device made according to the invention.

FIG. 1 shows constructions of a main portion of the main body B and the disc magazine case A. As shown in the figure, the disc magazine case A is of a plate-like configuration, oblong in its plan view and having a certain thickness. This case A can house a disc 1 rotatably in a playback mode with a clamper opening 2 formed in the upper plate thereof, a turntable opening 3 and a laser beam slot 4 formed in the lower plate thereof and a rack 5 formed on one side thereof.

Figure 2:
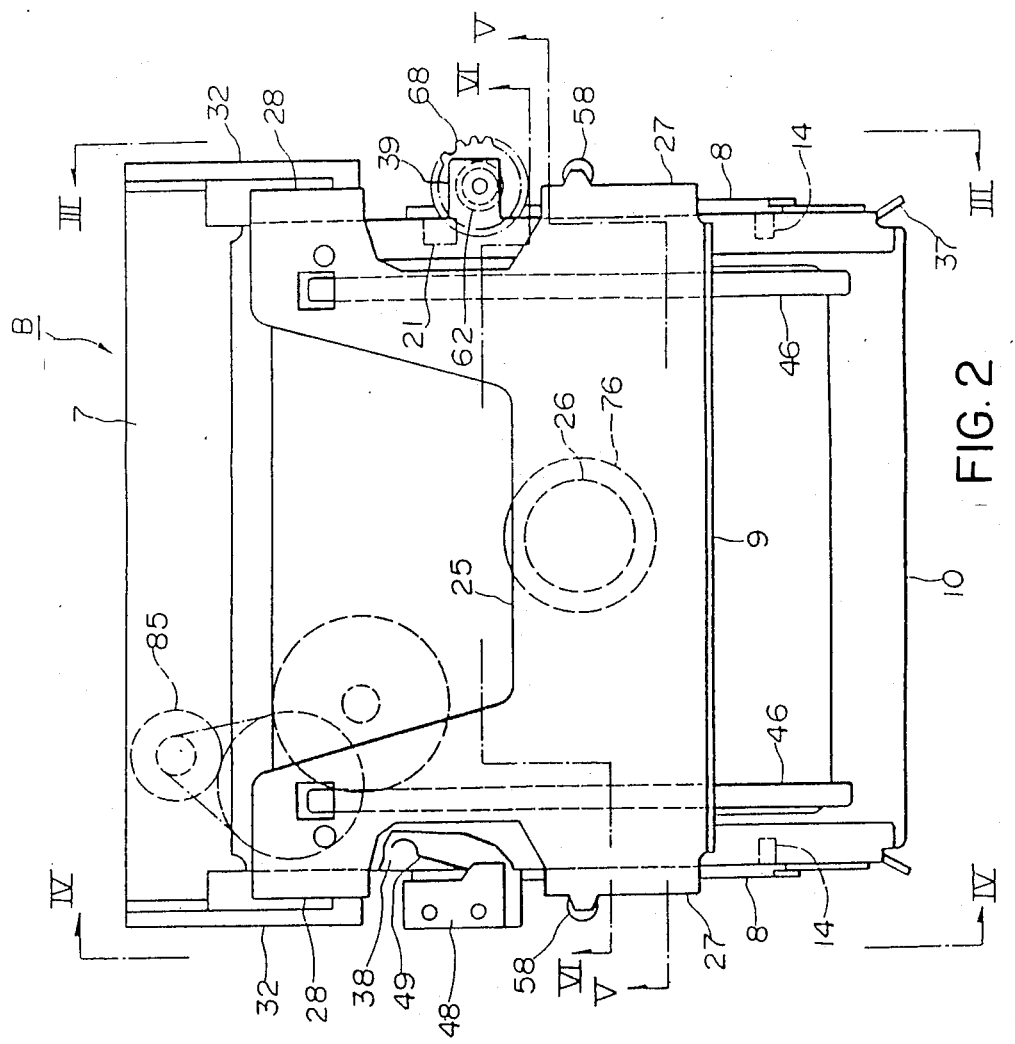
FIG. 2 is a plan view of this embodiment.
Figure 3:
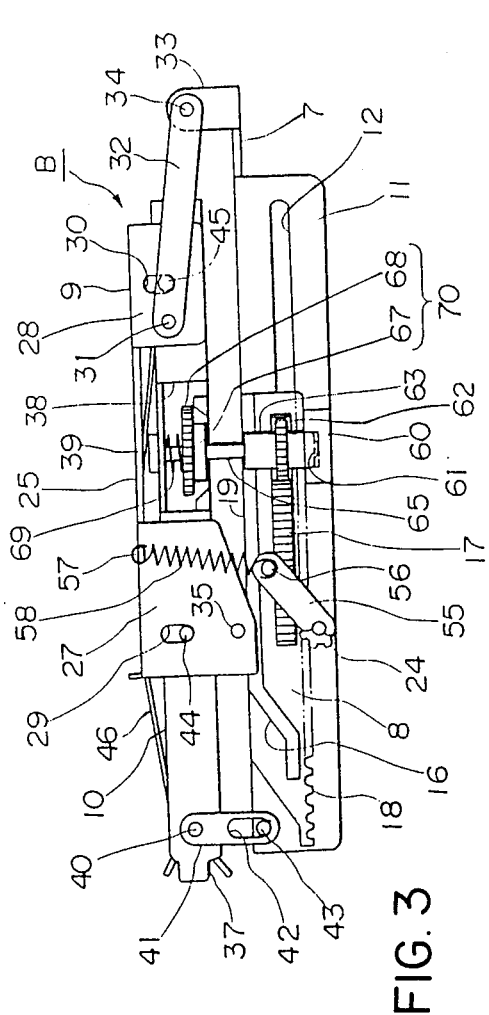
FIG. 3 is a side elevation taken along lines III—III in FIG. 2.
Figure 4:
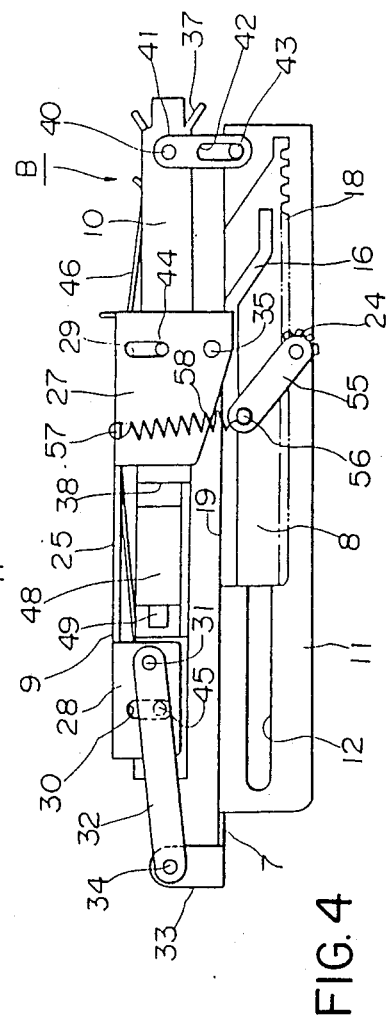
FIG. 4 is a side elevation taken along lines IV—IV in FIG. 2.
Figure 15:
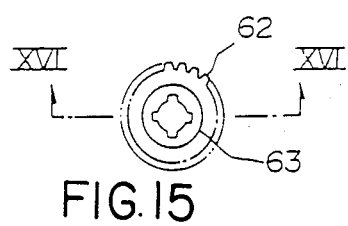
FIG. 15 is a plan view of a spline joint and a carrier pinion.
Figure 17:
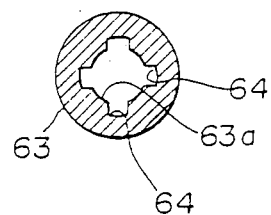
FIG. 17 is a sectional view taken along lines XVII—XVII in FIG. 16.
Figure 16:
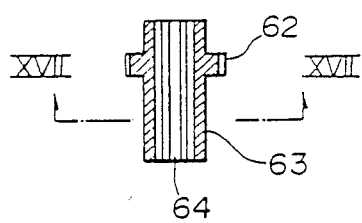
FIG. 16 is a vertical sectional view taken along lines XVI—XVI in FIG. 15.

A main portion of the main body B is shown in FIGS. 1 through 6. As illustrated in these figures, a chassis 7 is provided in an outer case (not shown) of the main body B. Carriers 8, 8 are mounted on the chassis 7 and a clamper 9 and a holder 10 are supported on the chassis 7. The chassis 7 is formed at left and right side edges thereof with downwardly bent side plates 11, 11. The side plates 11, 11 are respectively formed with a slot 12 extending in the longitudinal direction of the side plates 11, 11. The carriers 8, 8 provided on both sides of the chassis 7 are of a configuration symmetrical to each other. FIGS. 7 through 14 show details of the carrier 8 provided on the right side. As shown in these figures, the carrier 8 has a plate-like main wall 13. The main wall 13 is provided on one side thereof with guide pins 14 and 15 and, on the other side thereof, with a cam projection 16 and a carrier rack 17. The main wall 13 is also provided on the lower surface of the front half part thereof with a synchronizing rack 18. The upper surface of the main wall 13 is formed in a cam surface 19 which includes a flat portion 19a, a sloped portion 19b inclining downwardly from the front end of the flat portion 19a and a flat portion 19c extending slightly forwardly from the lower end of the sloped portion 19b. The guide pin 15 includes a guide portion 20 projecting laterally from the main wall 13 and an engaging portion 21 further projecting laterally from the guide portion 20. The cam projection 16 includes a flat portion 16a formed along the upper surface of the main wall 13, a sloped portion 16b inclining downwardly from the front end of the flat portion 16a and a flat portion 16c extending forwardly from the lower end of the sloped portion 16b. The carrier 8 provided on the left side is of the same construction except that it does not include the carrier rack 17. The carriers 8, 8 of the above construction are mounted on the chassis 7 in such a manner that they are movable forwardly and rearwardly with guide pins 14 and 15 engaged slidably in the slots 12. The guide pin 15 is so disposed that its guide portion 20 is located in the slot 12 and its engaging portion 21 is projecting in the interior of the chassis 7. As shown in FIG. 5, at the lower portions of the side plates 11, 11 of the chassis 7, there is provided rotatably a shaft 23 through openings 22, 22 formed in the side plates 11, 11. Synchronizing pinions 24, 24 are fixedly secured at the end portions of the shaft 23 projecting outwardly of the side plates 11, 11. These synchronizing pinions 24, 24 are in meshing engagement with the synchronizing racks 18, 18 of the carriers 8, 8 as shown in FIGS. 3 to 5. Due to this arrangement, when one of the carriers 8, 8 is moved forwardly or rearwardly, the other carrier is moved in the same manner, i.e., in synchronization, through the synchronizing pinions 24, 24 and the shaft 23.

The clamper 9 consists of a support plate 25 and a disc-like clamper main body 26 mounted on the central portion of the lower surface of the support plate 25 for holding the disc 1. The support plate 25 is formed on both sides thereof with front side plates 27, 27 and rear side plates 28, 28. The side plates 27, 27 are respectively formed with vertical slots 29, 29 and the side plates 28, 28 are respectively formed with vertical slots 30, 30. Clamper arms 32, 32 are secured rotatably at one end thereof to the side plates 28, 28 through pins 31, 31. The clamper arms 32, 32 are secured rotatably at the other end thereof to projections 33, 33 formed on the chassis 7 through pins 34, 34. Follower pins 35, 35 are fixedly secured to the lower portions of the side plates 27, 27 in such a manner that they will project inwardly of the support plate 25 and engage with cam surfaces 19, 19 of the carriers 8, 8.

The holder 10 is provided for housing the disc magazine case A therein and holding the same and is of a configuration resembling a window frame in its plan view. This holder 10 is formed in the front end thereof with an opening 37 for inserting the disc magazine case A and also formed on both sides thereof with openings 38, 38. A support projection 39 is formed on the side portion of the holder 10 above one of the openings 38, 38 (right side opening 38 in FIG. 2). Holder arms 41, 41 are rotatably secured to both sides of the front end portions of the holder 10 through pins 40, 40. The other ends of the holder arms 41, 41 are formed with slots 42, 42, and pins 43, 43 fixedly secured to the side plates of the chassis 7 are in fitting and slidable engagement with these slots 42, 42. Pins 44, 44, 45, 45 are fixedly secured to both sides of the holder 10 and these pins 44, 44, 45, 45 are inserted in the slots 29, 29, 30, 30 of the clampers 9, 9.

This construction enables the holder 10 to move vertically within a range in which the pins 43, 43 can relatively displace in the slots 42, 42. The clamper 9 can move vertically in a pivotal motion maintaining its horizontal posture by the pivotal movement of the clamper arms 32, 32. The vertical movement of the clamper 9 against the holder 10 is restricted within a range in which the pins 44, 44, 45, 45 can displace relatively in the slots 29, 29, 30, 30. The clamper 9 is constantly urged upwardly against the holder 10 by hold springs 46, 46 provided between the lower surface of the clamper 9 and the upper surface of the holder 10.

There is provided a limit switch 48 in one of the openings 38, 38 of the holder 10. This limit switch 48 is provided for detecting whether or not the disc magazine case A has been inserted in a predetermined position in the holder 10. As shown in FIG. 2, its actuator 49 is projecting in the interior of the holder 10.

Figure 20A:
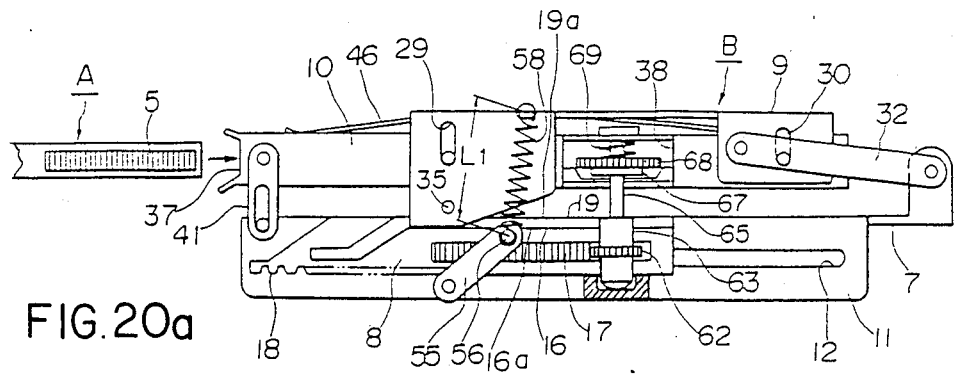
FIGS. 20a through 20c and FIGS. 21a through 21h are views for explaining operations of the embodiment of the mode switching device.

As described above, the shaft 23 provided with the synchronizing pinions 24, 24 is provided in the lower portions of the side plates 11, 11 of the chassis 7. At end portions of the shaft 23 projecting outwardly of the synchronizing pinions 24, 24 are rotatably secured one ends of clamping arms 55, 55. Pins 56, 56 are fixedly secured to the other ends of the clamping arms 55, 55 and clamp springs 58, 58 are provided between the outwardly projecting end portions of the pins 56, 56 and projections 57, 57 formed on the clamper 9. The pins 56, 56 project not only outwardly of the clamping arms 55, 55 but inwardly thereof, i.e., towards the carriers 8, 8 and these inwardly projecting portions of the pins 56, 56 are engaged with the lower surfaces of the cam projections 16, 16 of the carriers 8, 8. This arrangement causes the clamper 9 to be constantly urged downwardly by the force of the clamp springs 58, 58. Working lengths of these clamp springs 58, 58 are so set as to be $L3 \geqq L2 \geqq L1$ in states shown in FIGS. 20a, 20b and 20c (FIG. 20a shows a state before loading of the disc magazine case, FIG. 20b a state during loading of the case and FIG. 20c a state during playing of the disc. Operations of the device in these figures will be described later) so that a sufficient clamping force will be produced with a relatively small spring constant.

Figure 18:
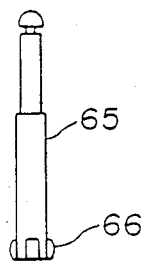
FIG. 18 is a front view of the spline shaft.

A support projection 60 is provided in the lower portion of one of the side plates 11, 11 of the chassis 7 at a position opposite to the support projection 39 of the holder 10. In a recess 61 formed in the upper portion of this support projection 60 is rotatably supported a spline joint 63 formed with a carrier pinion 62 about its outer periphery. The spline joint 63 and the carrier pinion 62 are illustrated in detail in FIGS. 15, 16 and 17. As shown in these figures, the spline joint 63 is a cylindrical member formed in its inside wall portion defining a central opening 63a with grooves 64 extending in the axial direction of the central opening 63a. The carrier pinion 62 is formed integrally with the spline joint 63 about the outer periphery of the upper portion thereof. In the state in which spline joint 63 is supported as described above, the carrier pinion 62 is meshed with the carrier rack 17 of the carrier 8. On the other hand, a spline shaft 65 is rotatably supported on the support projection 39 of the holder 10 with its lower end portion being inserted in the opening 63a of the spline joint 63. The spline shaft 65 has a configuration as shown in FIG. 18, having engaging projections 66 about the lower end portion thereof which engaging projections 66 engage in the engaging grooves 64 of the spline joint 63. This spline shaft 65 is vertically slidable relative to the spline joint 63 in a state in which the lower end portion of the spline shaft 65 is inserted in the opening 63a of the spline joint 63 and also is rotatable with the spline joint 63 when the spline joint 63 is rotated owing to the engagement of the engaging projections 66 in the engaging grooves 64. Further, the outer diameter of the lower portion of the spline shaft 65 is smaller by a predetermined value than the inner diameter of the opening 63a of the spline joint 63 and each of the engaging projections 66 is formed in a semi-circular shape in its side view so that the upper portion of the spline shaft 65 can be tilted slightly against the spline joint 63 about the portion in which the engaging projections 66 are formed. A disc-like friction plate 67 is fixedly secured to the upper end portion of the spline shaft 65. A loading pinion 68 is rotatably mounted on the upper surface of this friction plate 67 and a clutch spring 69 which is provided between the support projection 39 and the loading pinion 68 is wound about the spline shaft 65. The loading pinion 68 has a part of its outer peripheral portion located inside of the holder 10 through the opening 38 of the holder 10 and the loading pinion 68 comes into meshing engagement with the rack 5 of the disc magazine case A when the case A has been inserted in the holder 10. The loading pinion 68 is of a larger diameter than the carrier pinion 62, having a gear ratio larger than 1 with respect to the carrier pinion 62. Due to this arrangement, when the disc magazine case A is moved by rotating the loading pinion 68 as will be described later, the disc magazine case A can be moved by a relatively long distance by a relatively small displacement of the carrier 8. The loading pinion 68 is constantly urged against the friction plate 67 by the force of the clutch spring 69 and can be rotated in slipping engagement with the friction plate 67 if the loading pinion 68 is rotated with a force exceeding a predetermined value. When the friction plate 67 is rotated with the spline shaft 65, the loading pinion 68 is rotated with the friction plate 67 whereas when overload is applied during the rotation, the loading pinion 68 slips against the friction plate 67 and thereby allows the friction plate 67 and the spline shaft 65 only to rotate. Thus, the friction plate 67 and the loading pinion 68 constitute a friction clutch mechanism 70.

A disc driving motor 75 for driving the disc is fixedly secured to the lower surface of the central portion of the chassis 7. A turntable 76 is fixedly secured to the rotation shaft of the motor 75 projecting upwardly from the chassis 7. The turntable 76 is disposed in a position opposite to the main body 26 of the clamper 9.

As shown in FIGS. 1 and 6, a pair of guide bars 80, 80 extending in the moving direction of the disc magazine case A are provided under the rear end portion of the chassis 7. A head base 82 on which an optical pickup head 81 is secured is mounted on these guide bars 80, 80 in such a manner that the head base 82 is slidable along the guide bars 80, 80 forwardly and rearwardly. The head base 82 is formed with support walls 84, 84, 84 84 respectively having openings 83 and the guide bars 80, 80 are supported through these openings 83. On one side of one of the guide bars 80, 80 is provided a feed loading motor 85. The rotation of this motor 85 is transmitted to a gear wheel 89 disposed in the vicinity of one side of the head base 82 through a belt 86, a pulley 87 and a pinion 88 fixedly and coaxially secured to the pulley 87. A loading pinion 90 is fixedly and coaxially secured to the upper portion of the shaft of the gear wheel 89. The feed loading pinion 90 is meshed with a feed loading rack 91. Due to this arrangement, when the feed loading motor 85 is rotated, the rotational force reduced in speed through the pulley 87, pinion 88 and gear wheel 89 is transmitted to the pinion 90 and the rack 91 is thereby displaced to move the head base 82 forwardly (i.e., in the direction of arrow P2) or rearwardly (i.e., in the direction of arrow P1). A signal reading portion 81a of the pickup head 81 can move forwardly or rearwardly across an area beneath the laser beam slot 4 and read data recorded on the disc 1 when the disc magazine case A is set in a predetermined position in which the disc 1 can be played. The head base 82 can move not only within a range in which the signal reading portion 81a can read data of the disc 1, i.e., a range in which the signal reading portion 81a moves from a read-in position of the disc 1 (i.e., the beginning position of a track on which the data of the disc 1 is recorded, normally an innermost track position) to a read-out position of the disc 1 (i.e., the end position of this track, normally an outermost track position) but to such an extent that the signal reading portion 81a reaches a predetermined position which is radially outside of the read-out position in the disc 1 and in which a mode switching device 112 to be described later can perform switching between loading, playback and eject modes, i.e., a position in which a push rod 93 of a push switch 94 to be described later comes into abutting engagement with a stop 110. This device for moving the pickup head 81 constitutes, together with a tracking servo control system, a feed device 92 for constantly focusing the pickup head 81 at the signal track of the disc 1.

On the other side of the head base 82 is formed an engaging stepped portion 82a. When the head base 82 moves in the direction of the arrow P1 (i.e., rearwardly), the stepped portion 82a engages with the engaging portion 21 of the carrier 8 and thereby causes the carrier 8 to move in the direction of the arrow P1. On the upper surface of this side of the head base 82 is also provided a push switch 94 whose push rod 93 is projecting rearwardly. There are also provided guides 95, 95 on the upper surface of this side of the head base 82. Between these guides 95, 95 is mounted a slide hook 96 which crosses the push rod 93 and is slidable in the direction crossing the push rod 93. A pin 97 is fixedly secured to the upper surface of an inner end portion of the slide hook 96 and an end of a return spring 98 is secured to the pin 97. There are also provided pins 99 and 100 on the upper surface of the head base 82 and the return spring 98 is wound in its middle portion about the pin 99 and secured at the other end to the pin 100. Due to this arrangement, the slide hook 96 is constantly urged in the direction of arrow P3 (to the left as viewed in FIG. 1) by the force of the return spring 98.

The push switch 94 is constructed as a push-push type switch so that it triggers a control circuit for controlling turning on and off of the feed loading motor 85 and also performs switching between the loading, eject and playback modes as will be described later. This switch 94 is illustrated in an enlarged scale in FIG. 19. This switch is constructed in such a manner that when the push rod 93 initially is pushed in the direction of the arrow P2 and thereby locked in a main body 102 of the switch 94 (i.e., in a position shown by a solid line), a circuit provided in the main body 102 is in an ON state. If the push rod 93 is pushed a little further in the direction of the arrow P2 in this state, the push rod 93 is released from the locked state and moved in the direction of the arrow P1 by the force of a spring (not shown) up to a projecting position shown by a chain and dot line. This turns off the electrical circuit in the main body 102. When the push rod 93 is pushed in the direction of the arrow P2 again, the rod 93 is locked in the initial position shown by the solid line and the electrical circuit in the main body 102 is turned on.

The push rod 93 of the push switch 94 consists of a main rod portion 103 and an operation rod portion 104 formed at the foremost end of the main rod portion 103 and an operation projection 105 projecting rearwardly is formed at the rear end of the operation rod portion 104.

Figure 19:
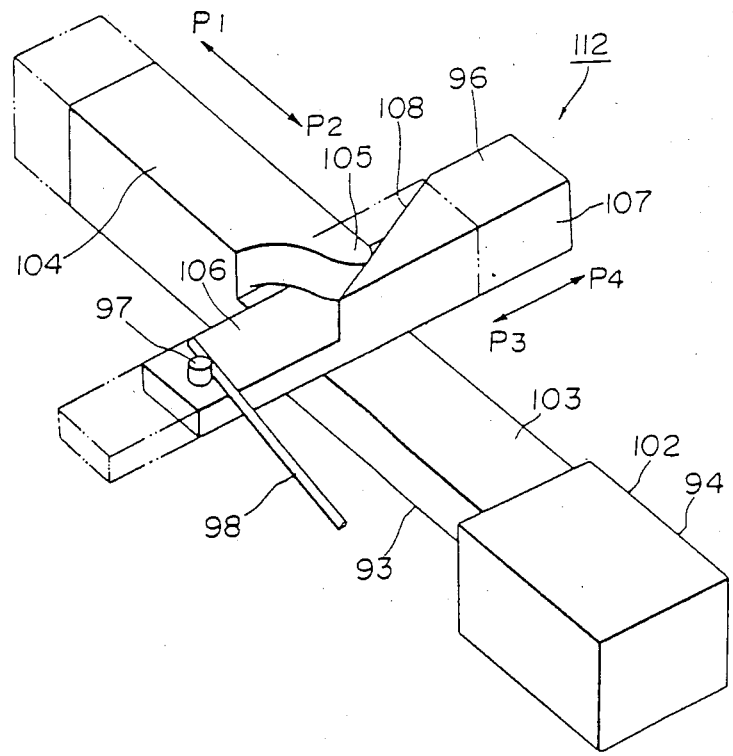
FIG. 19 is a perspective view showing a push switch and slide hook in an enlarged scale.

As shown in FIG. 19, slide hook 96 consists of a main wall portion 106 and an engaging wall portion 107 formed on one end portion (right end portion as viewed in the figure) thereof. A cam surface 108 is formed on the inner side (left side as viewed in the figure) of the engaging wall portion 107. This slide hook 96 is so disposed that it crosses the push rod 93 with the main wall portion 106 being located between the operation projection 105 and the main rod portion 103 and the cam surface 108 being in abutting engagement with the operation projection 105.

When the push rod 93 of the push switch 94 is pushed in the direction of the arrow P2 and is locked in the position shown by the solid line, the cam surface 108 of the slide hook 96 is pushed by the operation projection 105 and thereby is moved in the direction of arrow P4 to its projecting position (i.e., the position shown by a solid line). When the push rod 93 is pushed by a small distance in the direction of the arrow P2 from this state and thereby is released from the locked state and moved in the direction of the arrow P1 to the position shown by the chain and dot line, the operation projection 105 is moved in the direction of the arrow P1 and this allows the cam surface 108 of the slide hook 96 to move in the direction of the arrow P3. Thus, the slide hook 96 is moved in the direction of the arrow P3 by the force of the return spring 98 to a withdrawn position shown by a chain and dot line.

The slide hook 96 operating in the above described manner is located in a position projecting in the direction of the arrow P4 in the state shown in FIG. 1. In this state, if the head base 82 is moved in the direction of the arrow P2, the slide hook 96 is brought into engagement with the engaging portion 21 of the carrier 8 whereby the head base 82 can move the carrier 8 forwardly. When the slide hook 96 is in the position in which it has withdrawn in the direction of the arrow P3, the slide hook 96 does not engage with the engaging portion 21.

Rearwardly of the moving path of the head base 82 is provided a stop 110 against which the push rod 93 of the push switch 94 abuts when the head base 82 has moved by a predetermined distance in the direction of the arrow P1. The push switch 94 is so constructed that it is changed over when the head base 82 has moved in the direction of the arrow P1 to the position in which the push rod 93 has abutted against the stop 110.

The mechanism for moving the head base 82 forwardly and rearwardly and the mechanism for rotating the loading pinion 68 in association with the movement of the head base 82 as will be described later constitute a loading device 111. The head base 82, push switch 94, slide hook 96, return spring 98, stop 110 and engaging portion 21 of the carrier 8 constitute a mode switching device 112 for switching the mode between the loading, playback and eject modes when the signal reading portion 81a of the pickup head 81 has reached a predetermined position in the overstroke region. In the above construction, the loading switch 48 and the push switch 94 constitute a part of the control circuit which controls turning on and off of the feed loading motor 85. The control circuit receives various operation commands by operating of playback, stop, loading and eject buttons (not shown) provided in the main body B of the device.

Operations of the disc playback device of the above described construction during playback of the disc will now be described with reference to FIGS. 1 through 6, 20 and 21.

Figures 21A, 21B:
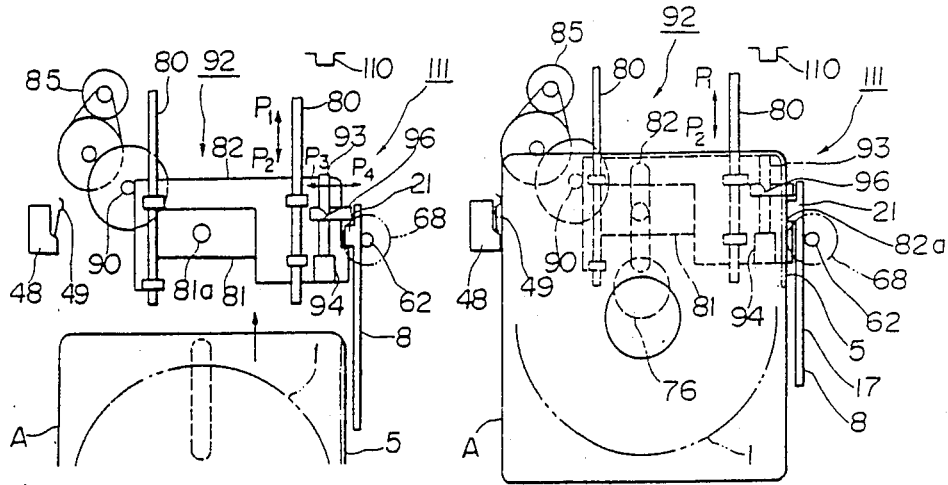

In a standby state prior to inserting the disc magazine case A, the clamper 9 and the holder 10 are in an elevated state as shown in FIG. 20a. In this state, the push rod 93 of the push switch 94 is in a state in which, as shown in FIG. 21a, it has moved in the direction of the arrow P2 and is locked and therefore the push switch 94 is in the loading mode.

Figure 20B:
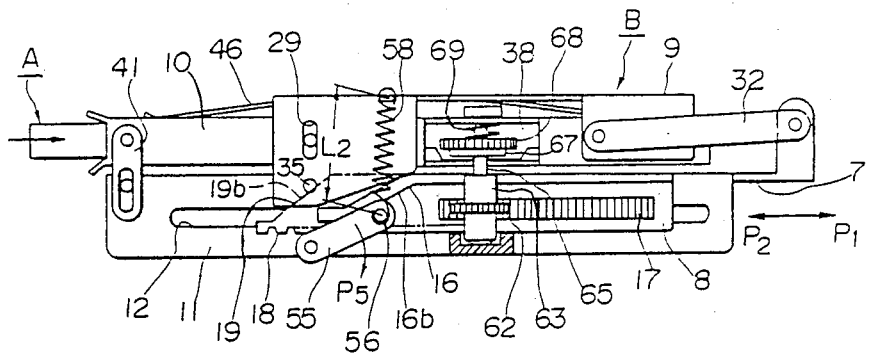
Figure 20C:
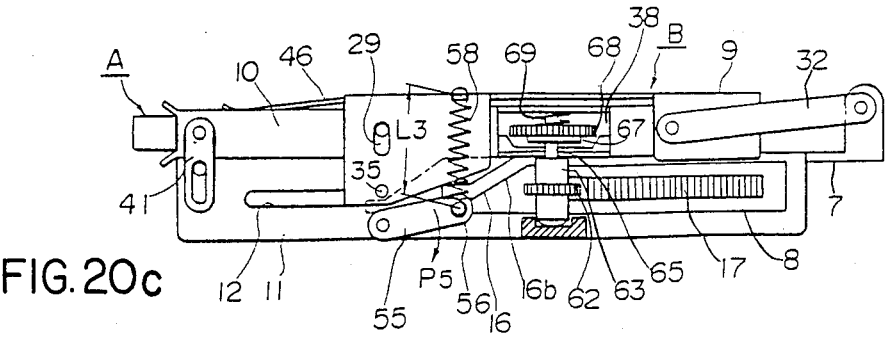
Figures 21C, 21D:
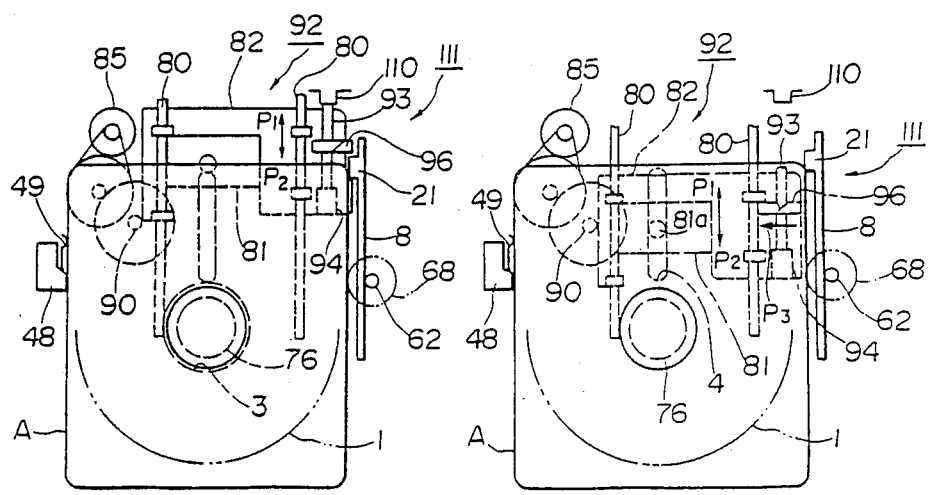
Figure 21E:
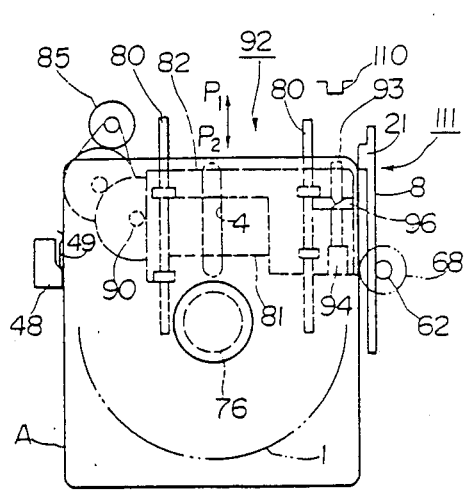
Figure 21F:
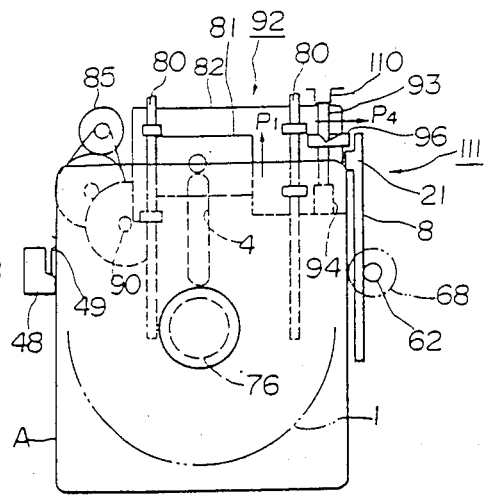

For playing the disc 1, the disc magazine case A housing the disc 1 is inserted into the holder 10 as shown in FIG. 20a. More specifically, the disc magazine case A is inserted manually up to a point at which its leading end portion engages with the actuator 49 of the loading switch 48 and the end portion of the rack 5 meshes with the loading pinion 68. The loading switch 48 is thereby turned on and this in turn switches on the feed loading motor 85. As the feed loading motor 85 is rotated, this rotation is transmitted to the feed loading pinion 90 and this pinion 90 causes the head base 82 to move in the direction of the arrow P1. FIG. 21b shows the condition the loading operation is in progress. The movement of the head base 82 in the direction of the arrow P1 causes the stepped engaging portion 82a of the head base 82 to engage with the engaging portion 21 of the carrier 8 thereby causing the carrier 8 to move with the head base 82 in the direction of the arrow P1. As the carrier 8 moves in this direction, the carrier pinion 62 which is in mesh with the carrier rack 17 of the carrier 8 is rotated as shown in FIG. 20b and this causes the spline joint 63 to rotate with resulting rotation of the spline shaft 65 and the friction plate 67. As the firction plate 67 is rotated, the loading pinion 68 which is in pressing engagement with the friction plate 67 is rotated. The loading pinion 68 thereby is brought into meshing engagement with the rack 5 and the disc magazine case A is moved in the direction of the arrow P1, i.e., towards the interior of the holder 10. The inner end portion of the pin 56 of the clamping arm 55 which is initially engaged with the flat portion 16a of the cam projection 16 as shown in FIG. 20a moves along the sloped portion 16b as shown in FIG. 20b as the carrier 8 moves in the direction of the arrow p1. This causes the clamping arm 55 to rotate in the direction of arrow P5 while pulling the clamp spring 58. In the meanwhile, the follower pin 35 of the clamper 9 which is initially engaged with the flat portion 19a of the cam surface 19 as shown in FIG. 20a moves downwardly along the sloped portion 19b as shown in FIG. 20b as the carrier 8 moves in the direction of the arrow P1. This causes the clamper 9 to fall downwardly causing the holder 10 to fall simultaneously through the hold spring 46. The members mounted on the spline shaft 65 such as the loading pinion 68 move downwardly with the holder 10 while being rotated because of the spline connection between the spline shaft 65 and the spline joint 63. Accordingly, the disc magazine case A moving in the direction of the arrow P1 moves downwardly with the holder 10 with the center of its turntable opening 3 located substantially above the center of the turntable 76 as shown in FIG. 21c. The follower pin 35 now engages with the flat portion 19c of the cam surface 19 as shown in FIG. 20c thereby holding the clamper 9 and the holder 10 at their lowermost positions. In this state, the pin 56 engages with the flat portion 16c of the cam projection 16 thereby rotating the clamping arm 55 further in the direction of the arrow P5 and pulling the clamp spring 58 further. By the pulling of the clamp spring 58, the hold spring 46 is distorted and the clamper 9 comes closer to the holder 10. The clamper main body 26 thereby enters the case A through the clamper opening 2 of the case A and abuts against a clamper 120 provided above the disc 1 in the case A. In the meanwhile, the turntable 76 enters the turntable opening 3 of the disc magazine case A since the case A supported by the holder 10 moves downwardly and abuts against the lower surface of the disc 1. Thus, the disc 1 in the disc magazine case A is held between the clamper main body 26 and the turn table 76 through the clamper 120 of the case A.

When in the above operation the turntable opening 3 of the disc magazine case A has reached a position above the turntable 76, the leading edge of the case A abuts against a stop (not shown) disposed in the holder 10 and stops its movement. Since the gear ratio of the loading pinion 68 to the carrier pinion 62 is larger than 1, the disc magazine case A travels a much longer distance than the carrier 8 until the leading end of the case A abuts against the stop. Since the loading pinion 68 constitutes the clutch system 70 with the friction plate 67, the pinion 68 stops its rotation slipping against the friction plate 67 which is still rotating. Then the disc magazine case A moves downwardly in meshing engagement with the loading pinion 68 slipping against the friction plate 67 and reaches its lowermost position.

Since the holder 10 is supported by the chassis 7 through the holder arm 41 and also by the clamper 9 and the clamper 9 in turn is supported by the chassis 7 through the clamper arm 32, in the downward movement of the holder 10, the holder 10 moves slightly in a pivotal motion rotating the holder arm 41 and the clamper arm 32 and thereby moves forwardly or rearwardly (i.e., in the direction of the arrows P2, P1). The spline shaft 65 which is supported in its upper end by the holder 10 is tilted slightly forwardly or rearwardly in its upper end portion. Since the spline shaft 65 is of a construction capable of tilting relative to the spline joint 63 as described above, the transmission of rotation from the spline joint 63 to the spline shaft 65 can be performed without trouble.

In the meanwhile, when the disc magazine case A has reached a position in which the disc can be played, the head base 82 is moved to the overstroke region with the push rod 93 of the push switch 94 coming into abutting engagement with the stop 110 as shown in FIG. 21c. This ceases the loading mode and starts the playback mode. More specifically, when the push rod 93 abuts against the stop 110, this push rod 93 is relatively pushed slightly in the direction of the arrow P2 and then the push rod 93 projects in the direction of the arrow P1 due to the action of a spring (not shown). The push switch 94 thereby is turned off. As the push switch 94 is turned off, the control circuit rotates the feed loading motor 85 reversely after a certain length of time lag. The slide hook 96 is withdrawn in the direction of the arrow P3 due to the force of the return spring 98. As the motor 85 is reversely rotated, the head base 82 is moved in the direction of the arrow P2 as shown in FIG. 21d. In the movement of the head base 82 at this time, the stepped engaging portion 82a is spaced off from the engaging portion 21 and the carrier 8 remains in the position. As the head base 82 moves in the direction of the arrow P2, the signal reading portion 81a of the pickup head 81 moves across the area beneath the laser beam slot 4 in the direction of the arrow P2. When the signal reading portion 81a has reached the read-in position, the head base 82 abuts against a limit switch (not shown) and the feed loading motor 85 is thereby stopped and the head base 82 stops its movement.

By the detection of the read-in position, the drive motor 75 is switched on to rotate the turntable 76 so that the disc 1 is rotated with the turntable 76. The feed loading motor 85 is switched on each time the tracking servo by a servo control system including a tracking mirror has reached its limit so as to displace the pickup head 81 by a necessary distance in the direction of the arrow P1. In this manner, the signal reading portion 81a of the pickup head 81 correctly reads data recorded on the disc 1 through the laser beam slot 4 and reproduction of the data from the disc is performed.

Figure 21G:
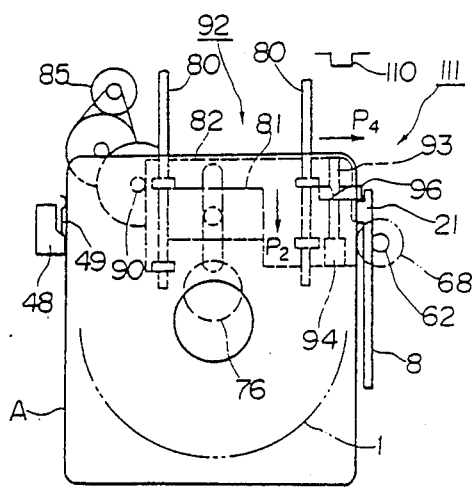
Figure 21H:
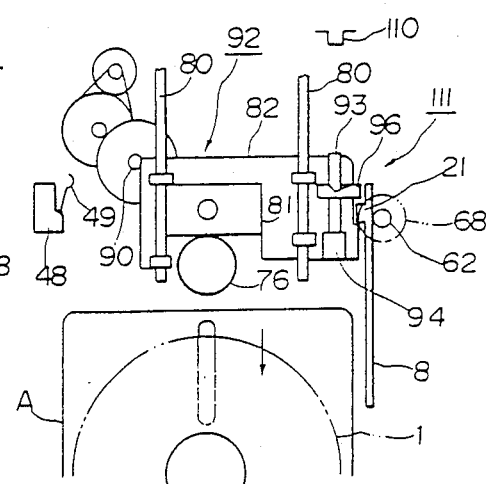

Upon completion of playback of the disc 1, a read-out detection device (not shown) detects the end of the track recorded on the disc 1 and a detection signal is supplied to the control circuit. In response to this detection signal, the control circuit switches the mode from the play mode to an eject preparation mode. Thereupon the head base 82 moves the pickup head 81 away from the disc 1 to the overstroke region in the direction of the arrow P1, i.e., from a state shown in FIG. 21e to one shown in FIG. 21f. Then the push rod 93 of the push switch 94 abuts against the stop 110 and the push switch 94 thereby is turned on. At this time, the device enters the eject mode. More specifically, since the push rod 93 at this time abuts against the stop 110 and is moved in the direction of the arrow P2, the slide hook 96 projects in the direction of the arrow P4. The control circuit causes the feed loading motor 85 to rotate reversely with a certain length of time lag after turning on of the push switch 94. The head base 82 thereby is moved in the direction of the arrow P2. Since the slide hook 96 at this time is projecting in the direction of the arrow P4, the slide hook 96 engages with the engaging portion 21 of the carrier 8 as shown in FIG. 21g thereby pushing the carrier 8 in the direction of the arrow P2. As the carrier 8 moves in the direction of the arrow P2, the carrier rack 17 rotates the carrier pinion 62 as in the loading mode. This causes the spline shaft 65 and the friction plate 67 to rotate which in turn causes the loading pinion 68 to rotate. At this time the loading pinion 68 rotates in a direction reverse to the rotation in the loading mode, moving the disc magazine case A in the direction of the arrow P2. When the rear end portion of the disc magazine case A is disengaged from the actuator 49 of the loading switch 48, the control circuit switches off the feed loading motor 85 whereby the eject mode comes to an end. Thus, the device returns to the initial state shown in FIG. 21h and in this state the disc magazine case A can be manually taken out of the main body B of the device.

In the above described embodiment, the disc magazine case housing the disc is loaded in the main body of the device. Alternatively, there may be provided a tray or like means for transferring the disc on the main body side so as to load the disc itself in the device.

What is claimed is:

1. A mode switching device in a disc playback device comprising:
   loading means for transferring a disc or a case housing a disc between an eject position in which the disc or the disc case is inserted and ejected and a playback position in which the disc can be played, thereby to load or eject the disc during a loading mode or eject mode, respectively;
   feed means for feeding a pickup head which reads data recorded on the disc in a playback mode in a radial direction of the disc set in the playback position, wherein there is an overstroke region extending radially outwardly of an outermost read-out position of the pickup head, wherein the feed means is capable of moving across the overstroke region; and
   mode switching means for performing switching of mode between the loading and playback modes and between the playback and eject modes when the feed means has reached a predetermined position in the overstroke region.

2. A mode switching device as defined in claim 1 wherein said feed means in the loading mode is operated in association with the loading means to load the disc and enters the overstroke region upon completion of the loading of the disc, said mode switching means switches from the loading mode to the playback mode upon entering of the feed means into the overstroke region, and in the playback mode said feed means is driven while driving of said loading means is interrupted.

3. A mode switching device as defined in claim 2 wherein said mode switching means switches the mode to the eject mode upon entering of said feed means into the overstroke region upon completion of playback of the disc and said feed means in the eject mode performs an ejecting operation in association with said loading means for driving said loading means in a direction reverse to the direction in which the loading means is driven during the loading mode.

4. A mode switching device in a disc playback device having a pickup head which reads data recorded on a disc comprising:
   loading means for transferring a disc (a) during a loading mode from a first position in which the disc is inserted into the device to a playback position in which the disc can be played, and (b) during an eject mode from the second position to the first position;
   feed means for feeding the pickup head during a playback mode in a radial direction with respect to the disc located in the playback position, wherein there is an overstroke region extending radially outwardly beyond an outermost read-out position of the pickup head and wherein the feed means is capable of moving the pickup head into the overstroke region; and
   mode switching means for (a) switching from the loading mode to the playback mode in response to the feed means reaching a predetermined position in the overstroke region, and (b) switching from the playback mode to the eject mode in response to the feed means reaching a predetermined position in the overstroke region.

5. A mode switching device as defined in claim 1 wherein said feed means is operated in association with the loading means to perform the loading operation and enters the overstroke region upon completion of the loading of the disc, wherein in the playback mode said feed means is driven to feed the pickup head radially with respect to the disc and the loading means remains stationary.

* * * * *